(12) United States Patent
Schlichting et al.

(10) Patent No.: US 11,596,106 B2
(45) Date of Patent: Mar. 7, 2023

(54) BALING APPARATUS

(71) Applicant: AGCO International GmbH, Neuhausen (CH)

(72) Inventors: Malte Cornelius Schlichting, Hillerse (DE); Harald Reupke, Wolfenbuttel (DE); Christian Adam, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 164 days.

(21) Appl. No.: 17/128,025

(22) Filed: Dec. 19, 2020

(65) Prior Publication Data
US 2021/0185933 A1      Jun. 24, 2021

(30) Foreign Application Priority Data

Dec. 19, 2019    (GB) ..................................... 1918839

(51) Int. Cl.
*A01F 15/07*          (2006.01)
*B65B 41/16*          (2006.01)

(52) U.S. Cl.
CPC ............ *A01F 15/071* (2013.01); *B65B 41/16* (2013.01); *A01F 2015/0755* (2013.01)

(58) Field of Classification Search
CPC ............ A01F 15/071; A01F 2015/0755; A01F 2015/072; A01F 2015/0725; A01F 15/00; A01F 15/07; A01F 15/0705; A01F 15/0715; B65B 41/16; B65B 35/243; B65H 2404/2615; B65G 15/14; B65G 15/16
See application file for complete search history.

(56) References Cited

U.S. PATENT DOCUMENTS

| 2005/0091959 A1* | 5/2005 | Viaud ................. A01F 15/0715 56/341 |
| 2016/0088797 A1 | 3/2016 | De Baere et al. |
| 2016/0113204 A1* | 4/2016 | Rosseel ................... B65B 41/12 53/167 |
| 2018/0295780 A1 | 10/2018 | Visser |

FOREIGN PATENT DOCUMENTS

| EP | 2 769 616 A2 | 8/2014 |
| EP | 3270682 B1 * | 12/2018 ......... A01F 15/0715 |
| GB | 2239420 A | 7/1991 |

OTHER PUBLICATIONS

European Patent Office, Search Report for related European Application No. EP 20 21 4893, dated May 10, 2021.
UK Intellectual Property Office, Search Report for priority Application No. GB1918839.0, dated Jun. 11, 2020.

* cited by examiner

*Primary Examiner* — Gregory W Adams (57) ABSTRACT

A supply apparatus for supplying wrapping material to a wrapper inlet of a baling chamber, in which a bale is to be wrapped. A reservoir supplies the wrapping material to an upper driven roller forming a lower part of the wrapper inlet. The wrapping material is guided to the wrapper inlet from above the wrapper inlet. A displaceable supply unit is located between the reservoir and the upper driven roller, the supply unit being moveable between a baling position and a wrapping position about a pivot axis located above the wrapper inlet. A free end of the wrapping material outside of the baling chamber is protected by the displaceable supply unit from air turbulence during operation of the baling apparatus.

19 Claims, 5 Drawing Sheets

BALING APPARATUS

CROSS REFERENCE TO RELATED APPLICATION

This application claims the benefit of U.K. Application No. GB 1918839.0, filed Dec. 19, 2019, which is hereby incorporated by reference in its entirety.

BACKGROUND

Field

The present invention relates to a baling apparatus and in particular to a supply apparatus and a method for supplying a wrapping material to a wrapping inlet of a baling chamber of the baling apparatus.

Description of Related Art

It is known to construct a baling apparatus in which, in use, the baling apparatus is towed along a windrow or swath of crop to be baled. The crop is fed by way of a pick-up mechanism through a crop feed inlet into a baling chamber where a bale is formed. Prior to ejection from the baling chamber, the bale is bound or wrapped by a wrapping material.

It is known to construct a baling apparatus in which the wrapping material is stored in a reservoir. Supply rollers are arranged to draw the wrapping material from the reservoir and, under the influence of gravity, a free end of the wrapping material is introduced to a rotating feeder roller. The rotating feeder roller then introduces the free end of the wrapping material into a baling chamber wrapper inlet where a leading edge becomes trapped between the bale to be wrapped and a number of endless belts defining a circumferential part of the baling chamber. Rotation of the bale within the baling chamber then causes the wrapping material to be drawn from the reservoir and to wrap the bale within the baling chamber. Once the bale has been wrapped a cutting apparatus acts to sever the wrapping material between the supply rollers and the feeder roller.

Such an arrangement has a number of problems. Crop fed into the baling chamber through the crop feed inlet may exit though the wrapper inlet interfering with a clean entry of the wrapping material into the wrapper inlet. Also, the rotation of the bale can create an air flow that disrupts movement of the leading edge of the wrapping material preventing the leading edge from reaching the rotating feeder roller either at all or in the desired fashion. Each of these results prevents wrapping of the bale within the baling chamber in the desired manner.

It is an advantage of the present invention that it seeks to address these problems.

SUMMARY

According to a first aspect of the present invention, in a wrapping material supply apparatus for supplying wrapping material to a wrapper inlet of a baling chamber, in which baling chamber a bale is to be wrapped with the wrapping material, the wrapping material supply apparatus comprises a reservoir from which the wrapping material is supplied to an upper driven roller forming a lower part of the wrapper inlet, the wrapping material being guided to the wrapper inlet from above the wrapper inlet, characterised in that the wrapping material supply apparatus further comprises wrapping material supply unit comprising a substantially parallel sided channel displaceable between a baling position and a wrapping position, the wrapping material supply unit being displaceable about a pivot axis located above the wrapper inlet.

Preferably the displaceable wrapping material supply unit has a wrapping material inlet and a wrapping material outlet, in which the wrapping material outlet may be pivoted toward and away from the baling chamber wrapper inlet.

Preferably, the displaceable wrapping material supply unit comprises at least one driven surface.

Preferably at least one of the sides of the channel comprises a driven conveyor.

Alternatively, opposing sides of the channel each comprise a driven conveyor. More preferably a conveyor on one side of the channel drives the conveyor on the other side of the channel.

Even more preferably, at least one of the sides of the channel is displaceable with respect to the other.

Preferably, one of the sides of the channel is biased with respect to the other. More preferably, the biased side of the channel comprises a central planar portion fixedly secured towards a lower end and located adjacent a biasing element towards an upper end.

Preferably the wrapping material supply apparatus further comprises a feed unit located between the reservoir and the displaceable wrapping material supply unit. More preferably, the feed unit comprises a pair of rollers, at least one of which is a driven roller.

According to a second aspect of the invention a baling apparatus comprises a wrapping material supply apparatus according to the first aspect of the invention.

Preferably a cutting apparatus is provided to sever the wrapping material between the supply rollers and the displaceable wrapping material supply unit.

Alternatively a cutting apparatus is provided to sever the wrapping material between the displaceable wrapping material supply unit and the wrapping inlet.

According to a third aspect of the invention, a method of wrapping a formed bale in a baling chamber of a baling apparatus comprising a wrapping material supply apparatus according to the first aspect of the present invention comprises the steps of creating a formed bale of in the baling chamber, moving the displaceable wrapping material supply unit from the baling position to the wrapping position, passing the wrapping material through the displaceable wrapping material supply unit to an upper driven roller forming a lower part of a wrapper inlet such that the upper driven roller directs the wrapping material into the baling chamber, allowing a quantity of the wrapping material to be drawn into the baling chamber through the wrapper inlet due to rotation of formed bale in the baling chamber, severing the wrapping material outside of the baling chamber, ceasing rotation of the formed bale and moving the displaceable wrapping material supply unit from the wrapping position to the baling position.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
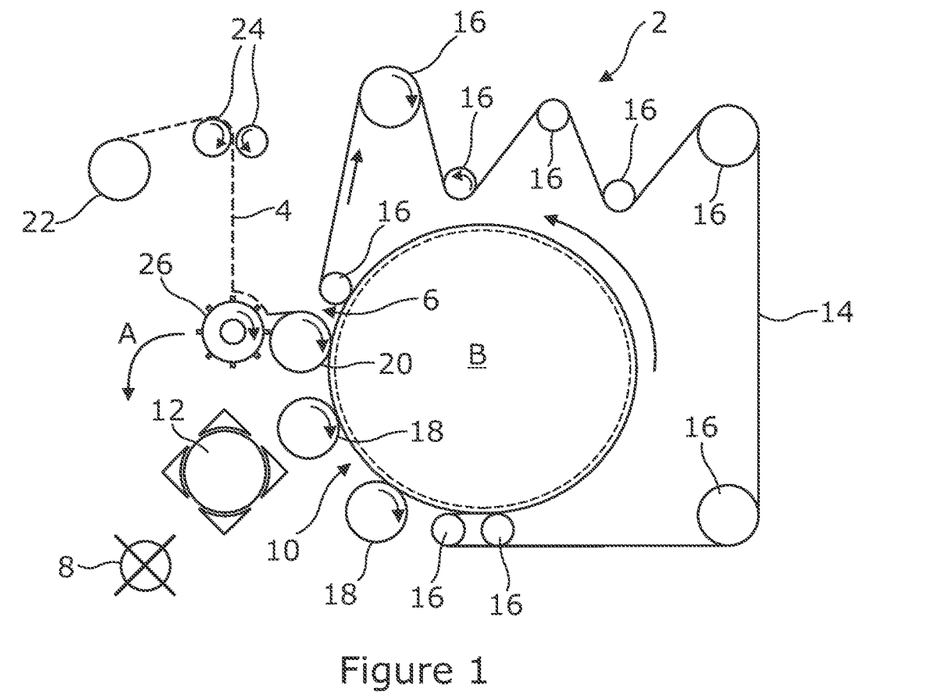
FIG. 1 shows a schematic side view of a known baling apparatus as wrapping material is fed to a wrapping inlet of a baling chamber.

With reference to FIG. 1, a schematic side view of a known baling apparatus 2 is shown as a wrapping material 4 is fed to a wrapping material inlet 6 of a baling chamber. Many different kinds of wrapping material are known including rope-like twine, knitted netwrap, plastic or fabric sheets, and film-type sheets.

A round baler for creating cylindrical bales of agricultural material (hay, straw, silage or other suitable agricultural material) by means of a variable round chamber is shown. The invention is also applicable to a baling apparatus in which a fixed volume round chamber is provided.

In FIG. 1, as the baling apparatus is moved forwards (from left to right in FIGS. 1 to 4) agricultural material is lifted from the ground by a pick-up unit 8 and passed through a baling chamber crop inlet 12 by way of a material feeding unit 10.

The baling chamber is defined by a series of parallel endless belts 14 passing around a sequence of conveyor rollers 14, including driven rollers and idler rollers, as well as by a number of separate conveyor rollers including starter rollers 18 defining the baling chamber crop inlet 12 to the baling chamber. The parallel endless belts 14 may take any suitable form. An upper driven conveyor roller 20 together with an idler roller around which the conveyor belts 14 pass defines the wrapping material inlet 6.

A reel 22 of wrapping material 4 is stored in a reservoir. A free end of the reel 22 of wrapping material 4 extends from the reservoir through a pair of supply rollers 24. At least one of the pair of supply rollers 24 is a driven roller. A wrapping material feeding unit is located beneath the free end of the wrapping material 4 depending from the pair of supply rollers 24. In FIG. 1, the wrapping material feeding unit takes the form of a driven roller 26.

Once a bale of desired size has been formed in the baling chamber, the baling apparatus 2 enters a wrapping mode. The rollers 16, 18 continue to be driven allowing a formed bale B to rotate (in the anticlockwise direction shown in FIG. 1) within the baling chamber. The driven roller 26 of the wrapping material feeding unit is also driven in a clockwise manner. At least one of the pair of supply rollers 24 is driven to draw the wrapping material 4 from the reservoir and lower a free end towards the wrapping material feeding unit.

On contacting the driven roller 26 of the wrapping material feeding unit, the free end of the wrapping material 4 is directed by the rotation of the driven roller 26 towards the upper driven conveyor roller 20 and by the rotation of the upper driven conveyor roller 20 through the wrapping material inlet 6 and into the baling chamber. Once in the baling chamber the free end of the wrapping material 6 is trapped between the formed bale B and the baling chamber. The wrapping material 6 is then pulled by the formed bale B from the reservoir until the formed bale B is considered to be fully wrapped.

The two supply rollers 24 are provided with a clutch arrangement allowing the wrapping material 6 be drawn past the supply rollers 24 at a greater velocity than provided for by the supply rollers 24. A cutting apparatus (not shown) then severs the wrapping material between the pair of supply rollers 24 and the wrapping material feeding unit to create a new free end of the wrapping material 24 depending from between the pair of supply rollers 24. Once the loose end has entered the baling chamber, rotation of the formed bale B is stopped and the formed bale B ejected from the baling chamber.

A cleaning mode may be provided for, in which rotation of the wrapping material feeding unit is reversed to dislodge any crop material that may have become lodged between the wrapping material feeding unit and the adjacent upper driven conveyor roller 20. Alternatively the wrapping material feeding unit may be pivoted away from the adjacent upper driven conveyor roller 20 (arrow A in FIG. 1) thereby allowing any trapped crop material to be released.

The baling apparatus is then returned to the baling mode. It will be noted that during baling stray crop material may as a result of the generated air flow exit the baling chamber though the wrapping material inlet 6. Such stray crop can become trapped between the wrapping material feeding unit and the adjacent upper driven conveyor roller. One solution is to keep the wrapping material feeding unit spaced from the upper driven conveyor roller 20 during baling and move it back toward the conveyor roller at the start of the wrapping cycle.

However, the air flow still remains and this can cause some crop to exit the baling chamber during the wrapping cycle before the wrapping material 4 passes over the gap between the wrapping material feeding unit and the adjacent upper driven conveyor roller 20. Further the air flow or air turbulence may disrupt the travel of the free end of the wrapping material 4 as it is delivered to the wrapping material feeding unit and then the adjacent upper driven conveyor roller 20. In certain circumstances this can lead to incomplete wrapping of the formed bale B or worse a failure to wrap the formed bale B.

It is an advantage of the present invention that the free end of the wrapping material 4 outside of the baling chamber is protected from air turbulence during operation of the baling apparatus.

Figure 2:
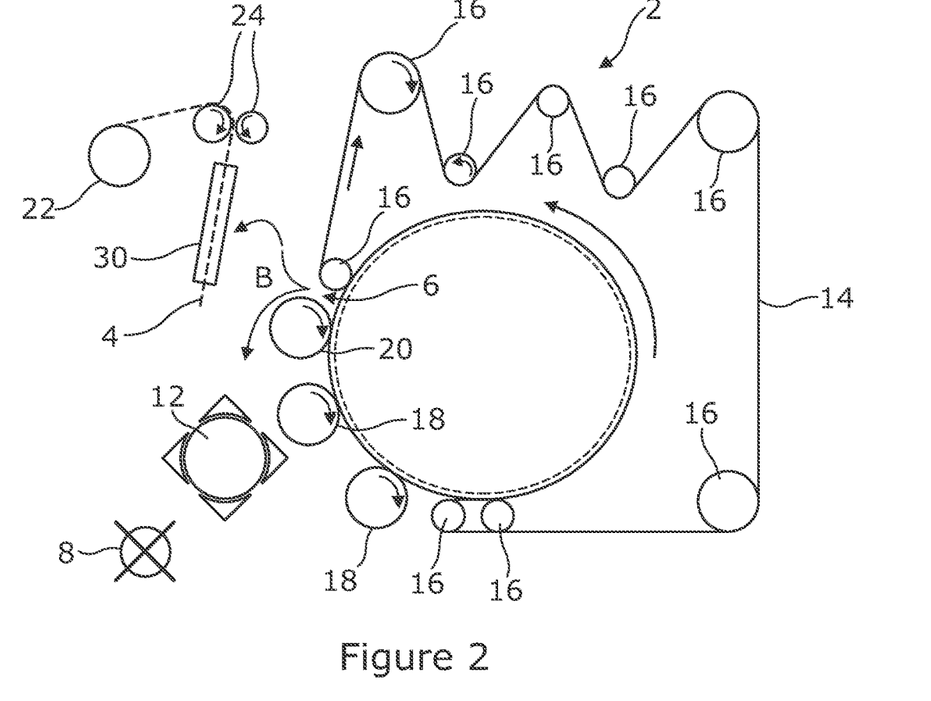
FIG. 2 shows a schematic side view of a first embodiment of a baling apparatus incorporating a wrapping material supply apparatus in accordance with the present application in which the wrapping material supply apparatus is in a baling position.

FIG. 2 shows a schematic side view of a baling apparatus incorporating a wrapping material supply apparatus in accordance with a first embodiment of the present invention for supplying wrapping material towards a wrapping material inlet of a baling chamber.

The same arrangement of the baling chamber to that shown in FIG. 1 is illustrated. Like reference numerals have been used for like parts. Similarly the pick-up unit 8 and material feed units 10 are identical. A reel 22 of wrapping material 4 is again stored in a reservoir. A free end of the reel 22 of wrapping material 4 again extends from the reservoir through a pair of supply rollers 24. Once more, at least one of the pair of supply rollers 24 is driven.

In FIG. 2 the wrapping material feed unit of FIG. 1 has been replaced by a wrapping material supply unit to be described below.

In the embodiment of FIG. 2 the wrapping material supply unit takes the form of a pivotable elongate channel 30. The leading edge of the wrapping material 4 passes through the channel 30 and depends from a lower end of the channel 30. The channel 30 is mounted to be pivotable about a pivot axis located at an upper end of the channel 30. The channel 30 may be pivoted between a baling position and a wrapping position. An actuator (not shown) is provided to control the movement of the channel 30. The actuator may take any suitable form. Conveniently operation of the actuator may be controlled by a control unit located on the baling apparatus or by a controller provided on an agricultural vehicle connected to the baling apparatus in electronic communication with the actuator (such as for example by way of an ISOBUS network, that is a network in conformity with ISO 11783).

The wrapping material supply unit of FIG. 2 is shown in the baling position. As the wrapping material supply unit is not adjacent to the upper driven conveyor roller 20 it is no longer possible for loose crop to exit the baling chamber and become trapped as between the wrapping material feeding unit and the upper driven conveyor roller 20 in the embodiment of FIG. 1. Instead, as indicated by the arrows B ejected crop will be either directed against an outer side of the channel 30 and downwards to the crop material feed unit 10 or directed downward onto the crop material feed unit 10. Accordingly, the first aspect of the invention provides a solution to one of the problems identified. However, it is anticipated that in some circumstances the air turbulence through the wrapping material inlet 6 may become funneled into the channel 30 disrupting entry of the free end of the wrapping material 4 through the wrapping material inlet 6 into the baling chamber.

Figure 3:
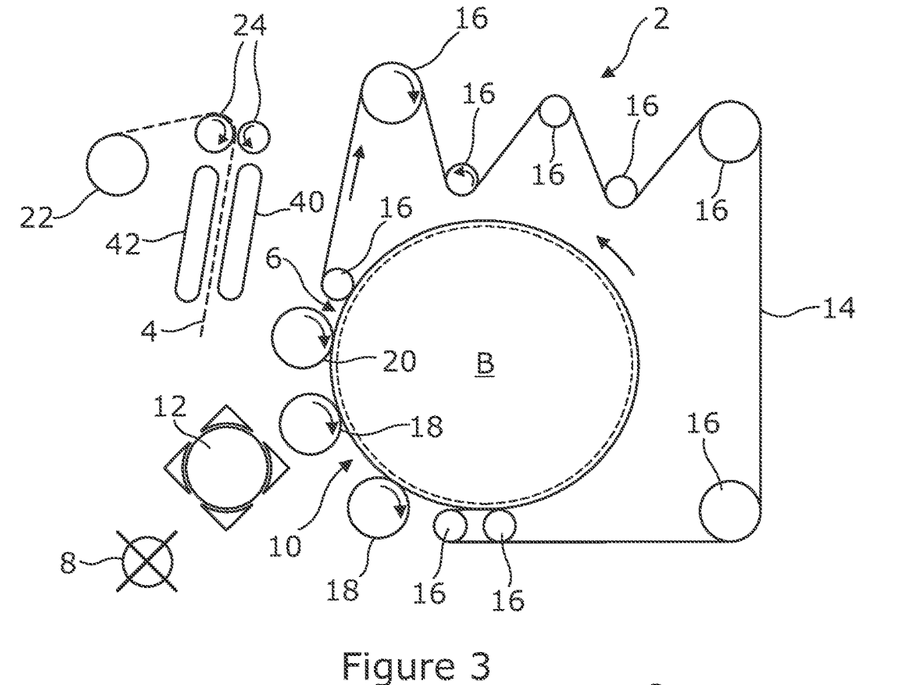
FIG. 3 shows a schematic side view of a second embodiment of a baling apparatus incorporating a wrapping material supply apparatus in accordance with the present application in which the wrapping material supply apparatus is in a baling position.
Figure 4:
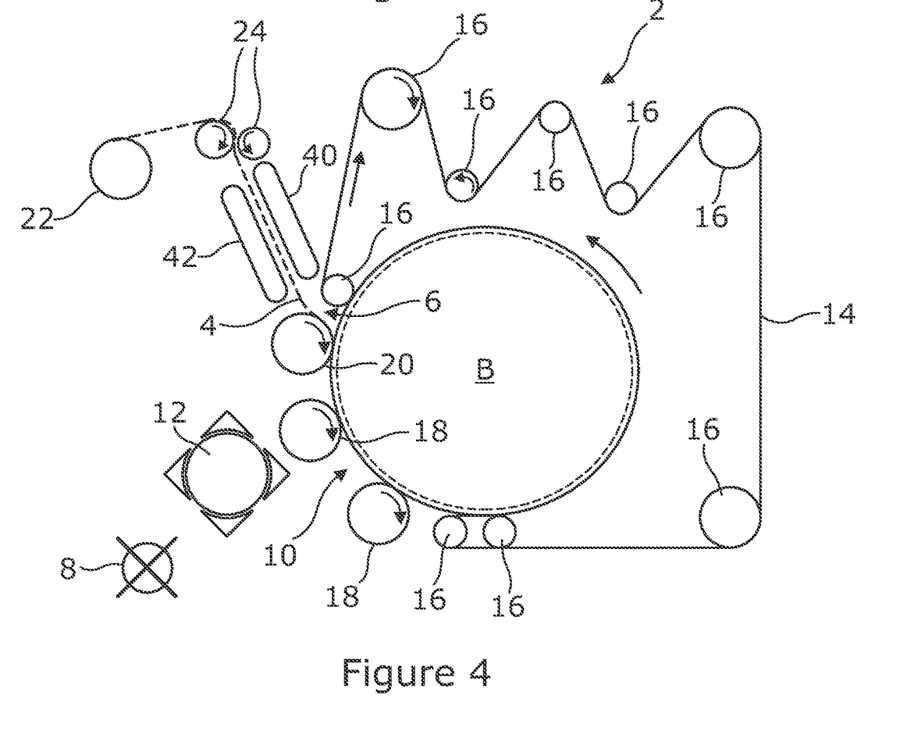
FIG. 4 shows a schematic side view of the baling apparatus of FIG. 3 in which the wrapping material supply apparatus is in a wrapping position.

FIGS. 3 and 4 show a schematic side view of a supply apparatus in accordance with a second embodiment of the present invention for supplying wrapping material towards a wrapper inlet of a baling chamber.

The same arrangement of the baling chamber to that shown in FIGS. 1 and 2 is again illustrated. Like reference numerals are once more used for like parts. Similarly the pick-up unit 8 and material feed unit 10 are identical. A reel 22 of wrapping material 4 is again stored in a reservoir. A free end of the reel 22 of wrapping material 4 again extends from the reservoir through a pair of supply rollers 24. As before, at least one of the pair of supply rollers 24 is driven.

In the second embodiment the wrapping material supply unit takes the form of a pivotal elongate apparatus (shown in more detail in FIGS. 5 and 6 discussed below) to create a channel through which the wrapping material 4 may be supplied. FIG. 3 corresponds to a baling position and FIG. 4 to a wrapping position. An actuator (not shown) is provided to control the pivoting movement of the wrapping material supply unit. The actuator may take any suitable form. Conveniently operation of the actuator may be controlled by a control unit located on the baling apparatus or by a controller provided on an agricultural vehicle connected to the baling apparatus in electronic communication with the actuator (such as for example by way of an ISOBUS network).

In this embodiment, the wrapping material supply unit takes the form of two aligned conveyor units 40,42.

Figure 5:
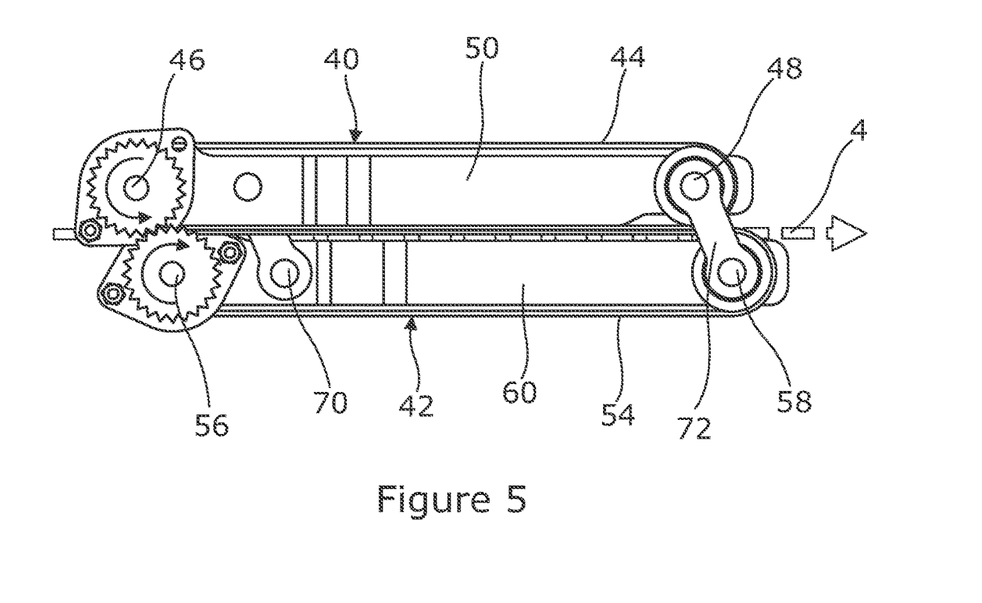
FIG. 5 shows a side view of elements of the wrapping material supply apparatus in accordance with the present invention adjacent one another.
Figure 6:
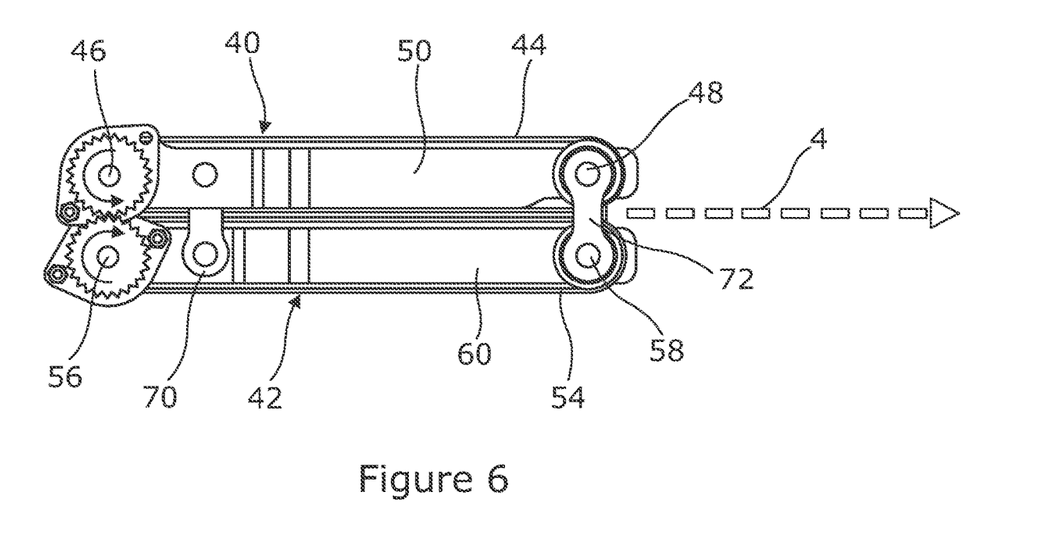
FIG. 6 shows the elements of FIG. 5 displaced from one another

The first conveyor unit 40 comprises an endless belt 44 adapted to be driven at a first end about a first roller 46 having a first axis. The second end of the first conveyor unit 40 is provided with a second roller 48 adapted for rotation about a second axis. Each of the first and second rollers 46,48 of the first conveyor unit 40 is mounted on a first frame element 50. The wrapping material supply unit is mounted to the baling apparatus to be pivoted about the first axis of the first roller 46.

The second conveyor unit 42 comprises an endless belt 54 adapted to be driven at a first end about a first roller 56 having a first axis. Conveniently the first roller 56 of the second conveyor unit 42 is provided with a gear arrangement 52 by which it may be driven by the first roller 46 of the first conveyor unit 40. The second end of the second conveyor unit 42 is provided with a second roller 58 adapted for rotation about a second axis. Each of the first and second rollers 56,58 of the second conveyor unit 42 is mounted on a second frame element 60.

A first link 70 is provided between the first and second conveyor units 40,42. The first link 70 is connected at a first end to the first frame element 50 in the region of the first end of the first conveyor unit 40 and at a second end to the second frame element 50 in the region of the first end of the second conveyor unit 42. A second link 72 is provided between the first and second conveyor units 40,42. The second link 72 is connected at a first end to the second roller 48 of the first conveyor unit 40 to at a second end to the second roller 58 of the second conveyor unit 42.

It can be seen that the first and second links 70,72 together with the first and second frame elements 50,60 form a parallelogram arrangement in which the first and second conveyor units 40,42 may be arranged to grip the wrapping material 4 between their respective endless belts 44,54 or may be spaced apart to form a channel through which the wrapping material 4 may freely pass (FIG. 6). A further actuator (not shown) is provided to control the relative movement of the first and second conveyor units 40,42. The further actuator may take any suitable form. Conveniently operation of the further actuator may be controlled by a control unit located on the baling apparatus or by a controller provided on an agricultural vehicle connected to the baling apparatus in electronic communication with the further actuator (such as for example by way of an ISOBUS network).

In the baling position (FIG. 3), the wrapping material supply unit is pivoted away from the wrapping material inlet 6. The first and second conveyor units 40,42 may be arranged together to hold the wrapping material 4 or may be arranged in a spaced apart configuration. In the embodiment described the first and second conveyor units 40,42 are spaced apart during forming of a bale.

Once the formed bale B is of the required size (step 400, FIG. 9), the first and second conveyor units 40,42 are brought together. The wrapping material supply unit is pivoted to the wrapping position (step 402) so that the second ends of the first and second conveyor units 40,42 are located adjacent the wrapping material inlet 6. The driven supply rollers 24 and the first roller 46 of the first conveyor unit 42 are then driven to feed and direct a free end of the wrapping material 4 onto the upper driven conveyor roller 20 so that the free end of the wrapping material 4 is introduced into the wrapping material inlet 60 (step 404). As there is no gap between the first and second conveyor units 40,42 the air turbulence does not disrupt the flow of the wrapping material 4 to the upper driven conveyor roller 20.

Figure 9:
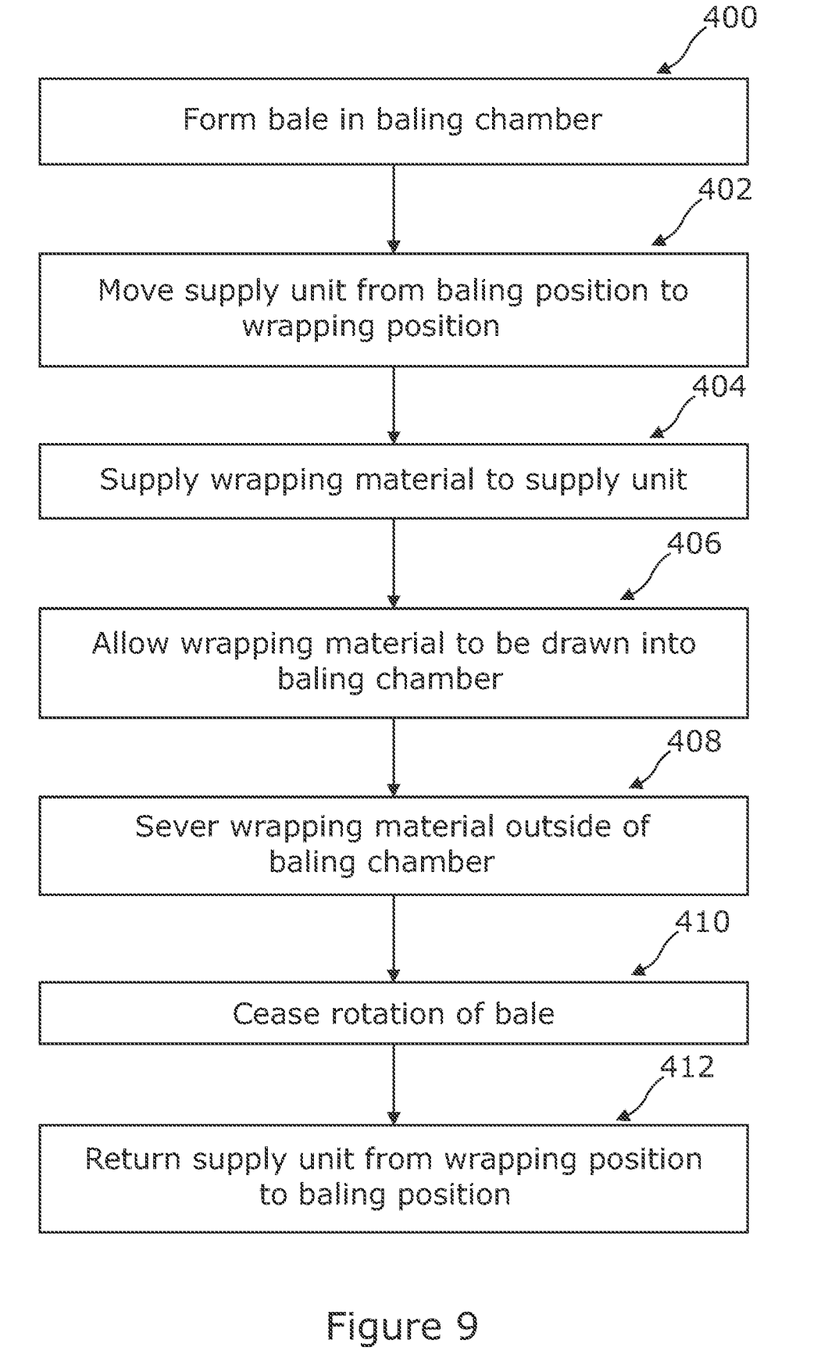
FIG. 9 shows a flow diagram of a method of operation of a wrapping material supply apparatus in accordance with the present invention.

Once in the baling chamber the free end of the wrapping material 4 becomes trapped between the formed bale B and the endless belts 14. The wrapping material 4 is then pulled by the formed bale B from the reservoir (step 406) until the formed bale B is considered to be fully wrapped. The first roller 46 of the first conveyor unit 40 is provided with a clutch arrangement allowing the wrapping material 4 be drawn past the conveyor units 40,42 at a greater speed than provided for by the drive of the first roller 46. Once several seconds have elapsed (sufficient for the wrapping material 4 to be being pulled into the baling chamber) the conveyor units 40,42 may be moved apart allowing for free running of the wrapping material 4 into the baling chamber.

Once the formed bale B has been wrapped, a cutting apparatus acts to sever the wrapping material 4 (step 408) between the supply rollers 24 and the wrapping material supply unit. Once a trailing end of the severed material has been drawn into the baling chamber around the formed bale, rotation of the bale may be ceased (step 410). The wrapping material supply unit can then be returned to the baling position (step 412) as the wrapped formed bale is ejected from the baling chamber.

This embodiment has as an additional advantage that the turbulence from the wrapping material inlet is addressed. It is an advantage that this occurs without the wrapping material supply unit entering the wrapping chamber through the wrapping material inlet.

In an alternative embodiment (not shown) the driven supply roller(s) 26 may be omitted, and replaced with idler rollers, such that feeding of the wrapping material is controlled solely by the wrapping material supply unit. In such an embodiment the wrapping material may be severed elsewhere, for example between the wrapping material supply unit and the wrapping inlet.

Figure 7:
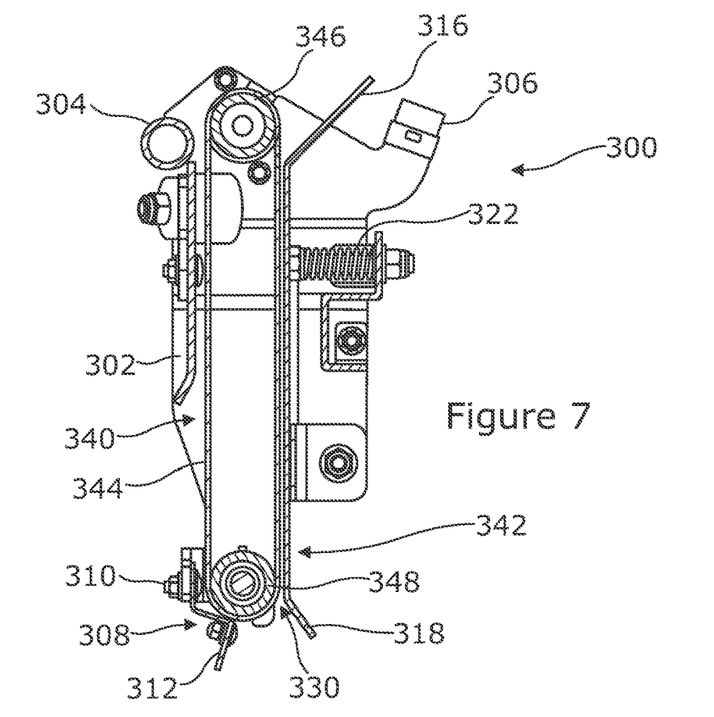
FIG. 7 shows a side sectional view of a wrapping material supply apparatus in accordance with a third aspect of the present invention in a baling position.
Figure 8:
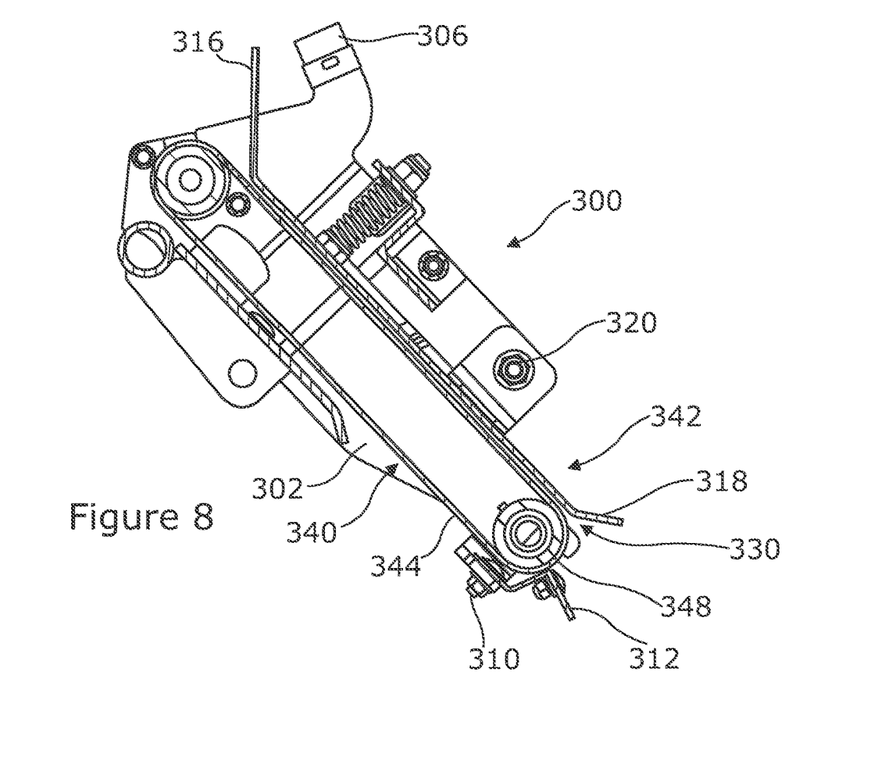
FIG. 8 shows a side sectional view of the supply apparatus of FIG. 7 in a wrapping position.

FIGS. 7 and 8 show a schematic side view of a supply apparatus in accordance with a third embodiment of the present invention for supplying wrapping material towards a wrapper inlet of a baling chamber.

In the third embodiment, a wrapping material supply unit 300 takes the form of a pivotal elongate apparatus with a channel through which the wrapping material 4 may be supplied. FIG. 7 corresponds to a baling position of the wrapping material supply unit 300 and FIG. 8 to a wrapping position of the wrapping material supply unit 300. An actuator (not shown) is provided to control the pivoting movement of the wrapping material supply unit 300. The actuator may take any suitable form. As in previous embodiments, operation of the actuator may be controlled by a control unit located on the baling apparatus or by a controller provided on an agricultural vehicle connected to the baling apparatus in electronic communication with the actuator (such as for example by way of an ISOBUS network).

In this embodiment, the wrapping material supply unit 302 takes the form of a frame element 302 on which a conveyor unit 340 and an adjacent biased planar element 342 are mounted.

The frame element 302 is mounted to the baling apparatus (not shown) about a pivoting shaft 364. The frame element is further provided with a first stop element 306 mounted at an upper and a guidance member 308 located adjacent a lower end of the conveyor unit 340. The guidance member 308 is secured to the frame element 302. The guidance member conveniently comprises a flexible member 312 secured to the frame element 302 by a suitable fastener 310. The flexible member 312 may be formed of any suitable material.

The conveyor unit 340 comprises an endless belt 344 adapted to be driven at a first end about a first roller 346 having a first axis. The second end of the conveyor unit 340 is provided with a second idler roller 348 adapted for rotation about a second axis.

The biased planar element 342 comprises a central generally planar portion 314 provided at each end with a guidance portion 316,318, each guidance portion 316,318 being angled away from the central planar portion 314 and the conveyor rollers 346,348. In use the central planar portion 314 extends substantially parallel to the endless belt 344 of the conveyor unit 340 and extends substantially alongside one side of the conveyor unit 340. The central planar portion 314 is fixedly secured to the frame element 202 towards a lower end of the central planar portion 314, for example by a suitable fastening arrangement 320. An upper end of the central planar portion 314 is located adjacent a biasing element. In the illustrated embodiment the biasing element comprises a spring element mounted between the frame element 302 and the central planar portion 314. In the illustrated embodiment, the spring element comprises a pair of laterally spaced helical springs 322 (one of which is shown in the sectional views of FIGS. 7 and 8).

In use a free end of a new reel of wrapping material is fed between the first conveyor unit 140 and the adjacent biased planar element 342, the upper guidance portion 316 assisting in the direction of the free end of the wrapping material between the conveyor unit 440 and the adjacent biased planar element 342. The supply rollers may be actuated to feed the free end of the wrapping material into the channel 330 until the free end of the wrapping material extends beyond the end of the conveyor unit and over the flexible member 312.

Alternatively the supply rollers and the conveyor unit 340 may be operated together such that the wrapping material is drawn into the channel 330 between the conveyor unit 340 and the planar element 342.

In the baling position (FIG. 7), the wrapping material supply unit is pivoted away from the wrapping material inlet. Once the formed bale is of the required size (step 400, FIG. 9), the wrapping material supply unit 300 is pivoted about shaft 364 into the wrapping position (step 402) so that the flexible member 312 and the lower guidance portion 318 are located adjacent the wrapping material inlet. The flexible member 312 and the lower guidance portion 318 together form a conduit to direct the free end of the wrapping material toward the wrapping material inlet. The driven supply rollers 26 and the first roller 46 of the first conveyor unit 42 are then driven to feed and direct a free end of the wrapping material onto an upper driven conveyor roller so that the free end of the wrapping material is directed into the wrapping material inlet (step 404).

The flexible member 312 ensures that the free end of the wrapping material is pressed into contact against the driven conveyor roller to ensure that the driven conveyor roller acts to transport the free end of the wrapping material to the wrapping material inlet.

As before, once in the baling chamber the free end of the wrapping material becomes trapped between the formed bale and the endless belts. The wrapping material is then pulled by the formed bale from the reservoir until the formed bale is considered to be fully wrapped (step 406). The first roller of the conveyor unit is conveniently provided with a clutch arrangement allowing the wrapping material be drawn past the conveyor unit at a greater speed than provided for by the drive of the first roller 146. As the wrapping material is drawn into the baling chamber, the wrapping material is placed in tension and stretched. In the present embodiment, during wrapping some of this tension is taken up by the central planar portion 314 pushing back against the springs 322. The lower guidance portion 318 also provides a surface to guide the wrapping material as it is drawn in through the chamber inlet into the baling chamber.

Once the formed bale has been wrapped, a cutting apparatus acts to sever the wrapping material between the supply rollers 24 and the wrapping material supply unit 300 (step 408). Once a trailing end of the severed material has been drawn into the baling chamber around the formed bale, rotation of the bale may be ceased (step 410). The wrapping material supply unit 300 can then be returned to the baling position as the wrapped formed bale is ejected from the baling chamber (step 412).

In alternative embodiments (not shown) where the wrapping supply unit comprises one or more driven members, the supply rollers may be provided only as idler rollers in order that control of the wrapping material may occur solely through operation of the driven member(s) of the wrapping supply unit. In such embodiments, the wrapping material may instead be severed between the wrapping supply unit and the chamber inlet.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A wrapping material supply apparatus for supplying wrapping material to a wrapper inlet of a baling chamber, in which baling chamber a bale is to be wrapped with the wrapping material, the wrapping material supply apparatus comprising:
a reservoir from which the wrapping material is supplied to an upper driven roller forming a lower part of the wrapper inlet, the wrapping material being guided to the wrapper inlet from above the wrapper inlet; and
a wrapping material supply unit comprising a channel having substantially parallel sides, the channel being displaceable between a baling position and a wrapping position, the wrapping material supply unit being displaceable about a pivot axis located above the wrapper inlet.

2. The wrapping material supply apparatus according to claim 1, wherein the displaceable wrapping material supply unit comprises a wrapping material inlet and a wrapping material outlet, wherein the wrapping material outlet may be pivoted toward and away from the baling chamber wrapper inlet.

3. The wrapping material supply apparatus according to claim 1, wherein the displaceable wrapping material supply unit comprises at least one driven surface.

4. The wrapping material supply apparatus according to claim 1, wherein at least one of the sides of the wrapping material supply unit channel is displaceable with respect to the opposing side of the channel.

5. The wrapping material supply apparatus according to claim 1, wherein one of the sides of the wrapping material supply unit channel is biased with respect to the opposing side of the channel.

6. The wrapping material supply apparatus according to claim 1, further comprising a feed unit located between the reservoir and the displaceable wrapping material supply unit.

7. The wrapping material supply apparatus according to claim 6, wherein the feed unit comprises a pair of rollers, at least one of which is a driven roller.

8. A baling apparatus comprising the wrapping material supply apparatus according to claim 1.

9. A wrapping material supply apparatus for supplying wrapping material to a wrapper inlet of a baling chamber, in which baling chamber a bale is to be wrapped with the wrapping material, the wrapping material supply apparatus comprising:
a reservoir from which the wrapping material is supplied to an upper driven roller forming a lower part of the wrapper inlet, the wrapping material being guided to the wrapper inlet from above the wrapper inlet; and
a wrapping material supply unit comprising a channel having substantially parallel sides, the channel being displaceable between a baling position and a wrapping position, wherein opposing sides of the wrapping material supply unit channel each comprise a driven conveyor.

10. The wrapping material supply apparatus according to claim 9, wherein a conveyor on one side of the wrapping material supply unit channel drives the conveyor on the opposing side of the channel.

11. The wrapping material supply apparatus according to claim 9, wherein the displaceable wrapping material supply unit comprises a wrapping material inlet and a wrapping material outlet, wherein the wrapping material outlet may be pivoted toward and away from the baling chamber wrapper inlet.

12. The wrapping material supply apparatus according to claim 9, wherein the displaceable wrapping material supply unit comprises at least one driven surface.

13. The wrapping material supply apparatus according to claim 9, wherein at least one of the sides of the wrapping material supply unit channel is displaceable with respect to the opposing side of the channel.

14. The wrapping material supply apparatus according to claim 9, wherein one of the sides of the wrapping material supply unit channel is biased with respect to the opposing side of the channel.

15. The wrapping material supply apparatus according to claim 9, further comprising a feed unit located between the reservoir and the displaceable wrapping material supply unit.

16. The wrapping material supply apparatus according to claim 15, wherein the feed unit comprises a pair of rollers, at least one of which is a driven roller.

17. A wrapping material supply apparatus for supplying wrapping material to a wrapper inlet of a baling chamber, in which baling chamber a bale is to be wrapped with the wrapping material, the wrapping material supply apparatus comprising:
- a reservoir from which the wrapping material is supplied to an upper driven roller forming a lower part of the wrapper inlet, the wrapping material being guided to the wrapper inlet from above the wrapper inlet; and
- a wrapping material supply unit comprising a channel having substantially parallel sides, the channel being displaceable between a baling position and a wrapping position, wherein one of the sides of the wrapping material supply unit channel is biased with respect to the opposing side of the channel, wherein the biased side of the wrapping material supply unit channel comprises a central planar portion fixedly secured towards a lower end of the channel and located adjacent a biasing element towards an upper end of the channel.

18. The wrapping material supply apparatus according to claim 17, wherein the displaceable wrapping material supply unit comprises a wrapping material inlet and a wrapping material outlet, wherein the wrapping material outlet may be pivoted toward and away from the baling chamber wrapper inlet.

19. The wrapping material supply apparatus according to claim 17, wherein the displaceable wrapping material supply unit comprises at least one driven surface.

* * * * *